Figure 1:
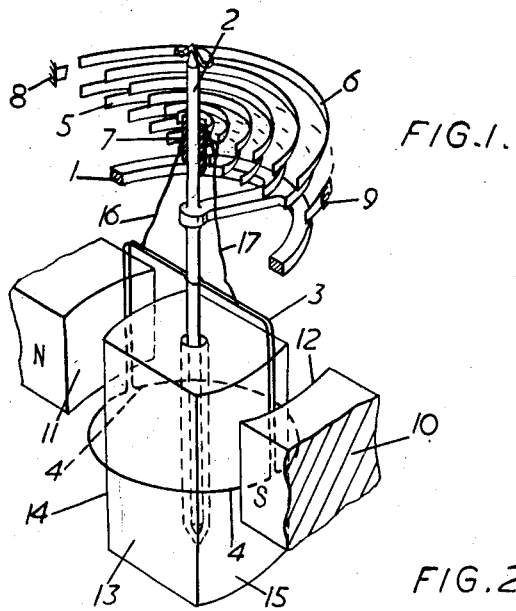

March 3, 1964     R. C. BRAITHWAITE ETAL     3,123,755
ELECTRICAL SYSTEM FOR MAINTENANCE
OF MECHANICAL OSCILLATIONS
Filed Jan. 8, 1959

R. C. BRAITHWAITE
F. N. M. SERGEANT
      *Inventors*

By *Moore & Hall*
      *Attorneys*

3,123,755
ELECTRICAL SYSTEM FOR MAINTENANCE OF MECHANICAL OSCILLATIONS
Robert Cecil Braithwaite and Frank Norris Moore Sergeant, Bishop's Cleeve, near Cheltenham, England, assignors to Smiths America Corporation, Washington, D.C.
Filed Jan. 8, 1959, Ser. No. 785,671
Claims priority, application Great Britain Jan. 8, 1958
6 Claims. (Cl. 318—132)

The present invention relates to timing devices of the kind having an inertial member mounted for rotation about an axis and resiliently restrained towards a datum position by a force substantially proportional to its displacement from the datum position, oscillations of the inertial member about the datum position being sustained by impulses delivered to it by electromagnetic means. The inertial member may for example be a pendulum or a spring-restrained balance.

It is an object of the present invention to provide a timing device of the kind referred to which is relatively simple.

According to the present invention we provide a timing device of the kind referred to comprising an inertial member adapted to oscillate about a datum position, co-operating magnetised and conducting members one of which is rigidly attached to or forms an integral part of the inertial member, and the other of which is in a fixed location such that voltage pulses are induced in the conducting member in conformity with the oscillations of the inertial member, and electric pulse-generating means connected to the conducting member the said means passing current pulses through the conducting member in response to said voltage pulses but in a sense opposing the said voltage pulses, interaction between the conducting and magnetic members during the said current pulses resulting in the production of impulses on the inertial member in a sense to maintain oscillations thereof.

Preferably the magnitude of the impulses produced on the inertial member decreases as the amplitude of its oscillations increases whereby said amplitude tends toward a constant value.

Preferably the pulse-generating means is such that said current pulses are only produced in response to induced voltage pulses of a particular sign and the circuit connected to the conducting member has a relatively high impedance when the voltage induced in the conducting member is of opposite sign.

Preferably the pulse-generating means comprises a transistor amplifier adapted to be energised from a low voltage D.C. source.

It is an object of the invention to provide a timing device having an inertial member mounted for rotation and employing a single coil to utilize the pulses from a pulse generating means to maintain oscillation of the balance. Rotation of the inertial member provides a simple structure readily reacting to resilient restraint toward a datum position. Within accepted limits of cost, this simple construction provides a more satisfactory result than heretofore obtainable with prior art structure.

Figure 2:
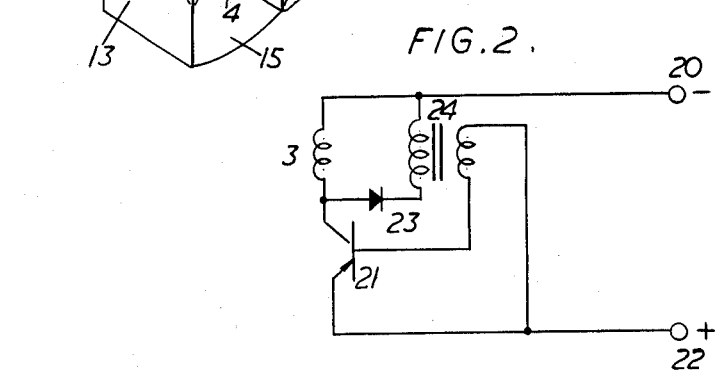
Figure 3:
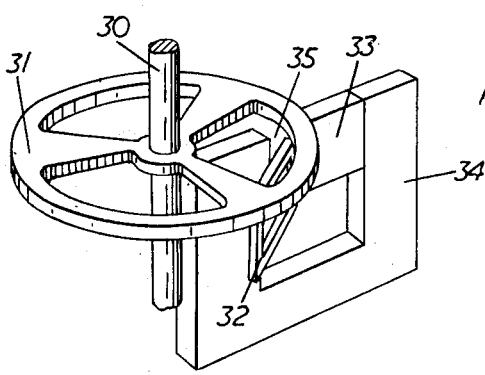

An embodiment of the present invention will now be described with reference to the accompanying drawings, of which FIGURE 1 shows a balance assembly and associated magnetic circuit, FIGURE 2 is a circuit-diagram of a pulse generator and, FIGURE 3 shows a modified form of the balance assembly and magnetic-circuit of FIGURE 1.

A balance wheel 1 and staff 2 of conventional form are mounted for rotation about the axis of the staff. For convenience it will be assumed that the staff is vertical. The staff carries a light coil 3 which is basically rectangular, three of the sides being substantially co-planar. The turns of the fourth side 4 are divided into two equal sections, each having the shape of a semi-circle, and together forming a circle lying in a plane which is perpendicular to the plane of the other three sides of the coil. The mid point of the side of coil 3 opposite the circular side is rigidly attached to staff 2 immediately below balance wheel 1 so that the circular side is below the point of attachment and centred on the axis of the staff. The other two sides are therefore vertical and on rotation of the staff and coil generate a cylindrical surface co-axial with the staff. The balance assembly is resiliently restrained against rotation by two hairsprings 5 and 6 of opposite hand attached to an insulating member 7 on the staff above the balance wheel. The hairsprings are respectively connected by wires 16, 17 to the ends of coil 3, and their stationary anchorages 8, 9 are suitably insulated.

A ring-shaped permanent magnet 10 is mounted with its poles symmetrically placed on either side of the lower part of staff 2. The magnet has concave cylindrical pole faces 11 and 12, co-axial with the staff. A thick-walled part-cylindrical, soft-iron, member 13 is situated in the space between the pole-faces 14, 15, being supported co-axially with the staff, which passes freely through it. The arrangement is such that when the balance assembly rotates the vertical sides of coil 3 pass freely through the gaps between soft-iron member 13, and pole faces 11 and 12, thus cutting the magnetic flux field in the gaps at right angles. In the mid-position the vertical sides lie midway in the respective gaps. The upper side of the coil lies above the soft-iron member and the lower circular side surrounds the soft-iron member without touching it.

The electric circuit connected to coil 3 through hairsprings 5 and 6 will now be described. A first terminal of coil 3 is connected to the negative terminal 20 of a low voltage D.C. supply. The second terminal of the coil is connected to the collector terminal of a transistor 21, the emitter terminal of which is connected to the positive supply terminal 22. The positive terminal of a rectifier 23 is connected to the collector terminal, and the negative terminal is connected through the primary coil of a transformer 24 to the negative supply terminal 25. The secondary coil of transformer 24 is connected between the base terminal and the emitter terminal of transistor 21.

The operation of the circuit is as follows:

When coil 3 oscillates in the magnetic flux field an alternating voltage is induced in it, and when the second terminal is positive with respect to the first a current flows through rectifier 23 and the transformer primary. The transformer is connected in such a sense that the voltage induced in the secondary coil in consequence of the increasing primary current drives the base terminal of transistor 21 negative with respect to the emitter terminal. A current commences to flow in the collector circuit, part of which flows through coil 3 in opposition to the induced voltage causing a force to act on the coil and balance tending to increase their angular velocity, and part of which flows through the rectifier and transformer primary. The increased current in the primary circuit of the transformer induces a greater voltage in the secondary circuit causing the collector current of the transistor to increase. It will be seen that the positive feedback through the transformer results in a rapid increase in the collector current and therefore the current through the coil. This process is halted by saturation in the core of the transformer causing the induced secondary voltage of the transformer to drop to zero, and when this occurs the transistor immediately returns to its initial quiescent condition. It will be apparent that a current pulse will only be initiated when the coil is passing through its rest position in one particular direction to produce a voltage pulse of the correct sense. Rectifier 23 raises the effective impedance of the coil circuit to reduce damping when the induced voltage is of the opposite sense.

The positions of stationary anchorages 8, 9 of hairsprings 5, 6 are adjusted in relation to permanent magnet 10 so that the mid point of the current pulse occurs when the balance and coil are passing through their rest position.

The pulse generating circuit tends to maintain the amplitude of the oscillations at a constant value. If the amplitude increases the angular velocity at any point in the oscillation increases together with the magnitude of the voltage induced in the coil. This voltage opposes the current pulse as explained earlier, and an increase in it causes a proportionate decrease in the magnitude of the current pulse thus tending to reduce the amplitude. A similar compensating action takes place if the amplitude falls below its normal value.

A variation in the supply voltage which changes the maximum value of the current through the coil is compensated by a change in the time which the transformer takes to saturate and hence of the duration of the pulse.

It is arranged that the balance swings through a little less than 180° on either side of its rest position. It is important to prevent the amplitude exceeding 180° (as a result of external interference) or more than one pulse will be initiated in a complete oscillation. The compensating action, explained above, assists in restoring the amplitude to its normal value, but mechanical stops may also be provided. An alternative method of preventing the occurrence of more than one pulse in a complete oscillation is to interpose a capacitor and resistor in parallel in the connection between the negative terminal of rectifier 23 and the primary of transformer 24. The capacitor is charged when a pulse occurs, and then prevents a further pulse being initiated until it has discharged through the resistor. The time constant of the capacitor and resistor are chosen so that after charging further pulses are blocked for a period which is a little less than the time of a complete oscillation. With this arrangement the normal amplitude may exceed 180°.

The collector current pulses may be employed for any purpose for which a timing signal is required. In particular an electromagnetic coil may be wired in series with the D.C. supply to operate mechanism driving the hands of a clock or watch. The balance assembly may be employed to drive the hands of a clock or watch directly. In this case the staff is provided with a roller and pin which engages with the fork of a lever carrying a single pallet. This engages alternately with the teeth of two meshing escapement wheels which drive the train. The escapement is shown and described in British specification No. 227,499. Alternatively the train may be driven by the balance assembly through an irreversible gear connection as shown and described in British specification No. 300,992.

FIGURE 3 shows a modified form of the balance assembly and magnetic circuit of FIGURE 1. A balance wheel 31 and staff 30 of conventional form are mounted for rotation about the axis of the staff. A rectangular coil 32 is secured to balance wheel 31 on one side near its periphery, the coil (when stationary) lying in a plane parallel to the axis of the staff. A short bar magnet 33 is secured between the arms of a U-shaped soft-iron member 34 so that there is a gap 35 between one pole of the magnet and the adjacent arm of member 34. This magnetic assembly is positioned so that it lies in a radial plane of staff 30, and coil 32 can pass freely through gap 35. It will be seen that the arm of member 34 adjacent to the gap lies between the staff and the locus of coil 32. The balance is restrained by a pair of oppositehanded hairsprings (not shown) similar to those shown in FIGURE 1. Coil 32 is connected by the hairsprings to the circuit of FIGURE 2. The hairspring anchorages are adjusted so that when the balance is in its rest position the coil is symmetrically situated in gap 35.

The operation of the modified arrangement is as follows:

When the coil passes through the gap a positive and a negative voltage pulse are induced in it in succession. The order of the pulses is independent of the direction of movement of the coil. Since the circuit of FIGURE 2 is only sensitive to pulses of a particular polarity, one driving pulse will be produced during each passage of the coil through the gap. The arrangement has the advantage that the balance may swing through approximately 330° on either side of its rest position. In other respects the working of the modified arrangement is similar to that of the original.

In a further modification a rectangular coil is attached to the balance wheel so that their planes are parallel. The magnetic assembly is positioned so that the coil passes through the gap with its plane at right angles to the direction of the magnetic flux field. It will be apparent that this modification is functionally identical with that previously described.

While there has been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

We claim:

1. A timing device comprising in combination a spring-restrained balance means mounted for rotation about an axis and constructed to oscillate about a datum position, a single coil operative as both a pickup coil and as a drive coil, said coil having a plurality of turns carried by said balance means at one side only of the axis thereof and movable therewith, a magnetized member positioned to cooperate with said coil when said balance means is in the vicinity of its datum position to induce voltage pulses in said coil, pulse-generating means, and electric connections for connecting said pulse-generating means and said coil, said pulse-generating means acting to pass current pulses through the same said coil in response to said induced voltage pulses and in a sense opposite to said voltage pulses, said current pulses and said magnetized member interacting to produce impulses on said balance means to maintain the oscillations thereof.

2. A timing device as claimed in claim 1 wherein the said coil is carried by the said balance means adjacent to the periphery of the balance means.

3. A timing device comprising in combination a spring-restrained disc-shaped balance means mounted for rotation about an axis and constructed to oscillate about a datum position, a single coil having a plurality of turns carried by said balance means and movable therewith, said coil being carried by said balance means adjacent to the periphery of said balance means, said coil being so positioned on said balance means that that axis of said coil which is at right angles to the plane of said coil intersects the said axis of rotation of said balance means at right angles, said coil being entirely to one side of the plane of said balance means, a magnetized member positioned to cooperate with said coil when said balance means is in the vicinity of its datum position to induce voltage pulses in said coil, pulse-generating means, and electric connections for connecting said pulse-generating means and said coil, said pulse-generating means acting to pass current pulses through said coil in response to said induced voltage pulses to maintain the oscillations of said balance means.

4. A timing device as claimed in claim 3 wherein the coil is rectangular with two of its sides parallel to the said axis of rotation of the balance means.

5. A timing device as claimed in claim 4 wherein the magnetized member is constructed and positioned to provide a unidirectional magnetic field intersecting the path of the coil, said field being so distributed that when one of the said two sides lies within the field the other lies in a substantially field-free region.

6. A timing device comprising in combination an inertial member rotatably mounted for oscillation about a datum position, magnetized means, movable conducting means mounted to move with said inertial member, said magnetized means being so positioned that voltage pulses are induced in said conducting means in conformity with the oscillations of said inertial member, and electric pulse-generating means connected to said conducting means and constructed to pass current pulses through said conducting means in respones to said voltage pulses and in a sense opposing said voltage pulses, said conducting means and said magnetic means interacting during said current pulses to produce impulses on said inertial member in a sense to maintain oscillations thereof.

References Cited in the file of this patent
UNITED STATES PATENTS

| | | |
|---|---|---|
| 2,574,136 | Warren | Nov. 6, 1951 |
| 2,769,946 | Brailsford | Nov. 6, 1956 |
| 2,838,693 | Van Horn | June 10, 1958 |
| 2,909,732 | Van Overbeek | Oct. 20, 1959 |